(12) United States Patent
Korus et al.

(10) Patent No.: US 8,882,006 B2
(45) Date of Patent: Nov. 11, 2014

(54) FLEXIBLE HOSE ASSEMBLY APPARATUS AND METHOD

(75) Inventors: Thomas J. Korus, Lindsay, NE (US); Charles H. Meis, Albion, NE (US)

(73) Assignee: Lindsay Corporation, Omaha, NE (US)

( * ) Notice: Subject to any disclaimer, the term of this patent is extended or adjusted under 35 U.S.C. 154(b) by 603 days.

(21) Appl. No.: 13/042,192

(22) Filed: May 9, 2011

(65) Prior Publication Data

US 2012/0286076 A1    Nov. 15, 2012

(51) Int. Cl.
| | |
|---|---|
| *B05B 3/18* | (2006.01) |
| *F16L 35/00* | (2006.01) |
| *A01G 25/09* | (2006.01) |

(52) U.S. Cl.
CPC ............ *F16L 35/00* (2013.01); *A01G 25/09* (2013.01)
USPC ............ 239/732; 239/722; 239/750; 138/120

(58) Field of Classification Search
USPC ............ 138/109, 108, 119, DIG. 8; 235/114, 235/115, 116, 185, 191, 262
See application file for complete search history.

(56) References Cited

U.S. PATENT DOCUMENTS

| | | | | |
|---|---|---|---|---|
| 973,901 | A | * | 10/1910 | Witzenmann ................. 285/114 |
| 3,929,164 | A | * | 12/1975 | Richter ......................... 138/120 |
| 4,307,754 | A | | 12/1981 | Muratsubaki |
| 4,549,694 | A | | 10/1985 | Davis et al. |
| 4,955,193 | A | * | 9/1990 | Hoeptner, III ................. 60/320 |
| 5,211,602 | A | * | 5/1993 | Holmgren ....................... 454/63 |
| 6,021,818 | A | * | 2/2000 | Horst et al. ................... 138/172 |
| 7,311,275 | B2 | | 12/2007 | Korus |
| 7,419,107 | B1 | | 9/2008 | Theilen |
| 2006/0283507 | A1 | | 12/2006 | Marcy |

* cited by examiner

*Primary Examiner* — Len Tran
*Assistant Examiner* — Viet Le
(74) *Attorney, Agent, or Firm* — Hovey Williams LLP (57) ABSTRACT

A hose-fed lateral move irrigation system and method that utilizes a pipe with a plurality of sprinklers attached to a wheeled cart that drags a flexible hose assembly therebehind while traveling laterally with the pipe and sprinklers relative to a field so that alternating the flexible hose assembly from one side of the cart to another as the cart traverses back and forth along a cart path is facilitated while kinking in the flexible hose assembly is avoided.

17 Claims, 9 Drawing Sheets

FLEXIBLE HOSE ASSEMBLY APPARATUS AND METHOD

BACKGROUND

1. Field

The present invention relates generally to an agricultural irrigation system and method. More specifically, embodiments of the present invention concern a hose-fed lateral move irrigation apparatus, the apparatus being particularly suitable for use with the irrigation system and method.

2. Discussion of Prior Art

Crops are cultivated throughout the world in a wide variety of climates with different terrains and soils. It is desirable in many of these climates to artificially supplement the climate's natural precipitation via irrigation systems to ensure crops receive adequate water. Additionally, irrigation systems can be used to deliver fertilizers and chemicals to, among other things, promote healthy crop growth, suppress weeds, and protect crops from frost.

Common irrigation systems for use with crops cultivated in fields include overhead irrigation systems. In such systems, water may be hose-fed and/or pipe-fed to one or more "hydrants" located centrally within or adjacent to a field. Alternatively, water may be ditch-fed by routing water into a ditch that runs along and/or through a field.

The hydrants or ditches are connected by a hose to an overhead high-pressure sprinkler network, which includes an elevated, elongated pipe that is supported by a plurality of trusses. The pipe includes a plurality of sprinklers spaced generally along an entire length of the pipe and may extend downward to within approximately three ft. of the crops to enable distribution of water to the crops from above.

Common overhead sprinkler network types include center-pivot systems and lateral-move systems.

Center-pivot systems are ideal for use in fields having circular crop areas and generally include a hydrant located in the middle of each circular crop area. In such systems, an elevated, elongated pipe with sprinklers extends from a hydrant to an outer circumference of the circular crop area such that the systems may be driven in a circular pattern over the crops to deliver water thereto during rotation.

Lateral-move systems are ideal for use in square, rectangular, and irregular-shaped fields, for example, "L" shaped fields. Such systems generally include one or more hydrants located in and/or adjacent to a field and/or one or more ditches located along or through a field that are connected to an elevated, elongated pipe with sprinklers. Unlike the center-pivot system having a pipe with a stationary end, the pipe in a lateral-move system is connected to and extends from a movable cart designed to traverse up and down a cart path. The pipe may be locked at an angle perpendicular to the cart path and pivot at an end at the cart path, which is desirable if the cart path extends down the middle of a field to enable pivoting from one side of the cart path to the other with each pass along the cart path.

When a conventional cart reaches an end of the cart path and a user desires to irrigate field on an opposite side of the cart path or re-irrigate field on a same, it is necessary to deactivate the hydrant, which may adversely affect other operations, disconnect the hose from one side of the cart and reconnect it to the other, reactivate the hydrant and reverse the cart's course along the cart path. Given that conventional hoses are typically very heavy, switching the hose from one side of the cart to another is time consuming and labor intensive; issues that are aggravated by each run along the cart path. Replacing conventional hoses with lighter-weight hoses is not ideal because such are susceptible to kinking and blockage of fluid, which is more likely when attempting to run with low pressure to save energy. Additionally, lighter-weight hoses are easily damaged when run over by equipment, such as a tractor, which may be required from time to time.

SUMMARY

The following brief summary is provided to indicate the nature of the subject matter disclosed herein. While certain aspects of the present invention are described below, the summary is not intended to limit the scope of the present invention.

Embodiments of the present invention provide an irrigation system and method that does not suffer from the problems and limitations of conventional irrigation systems such as those set forth above.

The present invention provides, in its simplest form, a hose-fed lateral move irrigation system and method that utilizes a pipe with a plurality of sprinklers attached to a pulling element (e.g., a wheeled hose-pull cart, hose-pull tower, or the like) that drags a hose assembly therebehind while traveling laterally with the pipe and sprinklers relative to a field. The system and method facilitates alternating the hose assembly from one side of the lateral-move element to another as the lateral-move element traverses back and forth along a path (e.g., a cart path) while avoiding kinking in the hose assembly.

The aforementioned aspects are achieved in one aspect of the present invention by providing an irrigation system having a liquid conduit for the delivery of liquid. The system includes a movable cart having a plurality of wheels, a flexible hose assembly secured to the movable cart and operable to provide a portion of the liquid conduit, and an internal link. The internal link is secured to the movable cart, housed in the liquid conduit, and operable to partially restrict at least a portion of the flexible hose assembly.

In some embodiments, the flexible hose assembly may include a first hose having a first minimum-bend diameter and a second hose having a second minimum-bend diameter that is greater than the first minimum-bend diameter. The first minimum-bend diameter may be less than a width of the movable cart, and the second minimum-bend diameter may be greater than the width of the movable cart.

The system may further include a coupling assembly in the second hose operable to secure the second hose to the first hose. A portion of the flexible hose assembly may be a transition region positioned adjacent to the coupling assembly in the first hose, the transition region may have a third minimum-bend diameter that is between the first minimum-bend diameter and the second minimum-bend diameter.

The system may further include a plurality of restricters secured to the internal link and housed in the transition region to define the third minimum-bend diameter. The internal link may be housed in the first hose and secured to the second hose. The internal link may be secured only to the movable cart and the second hose.

The coupling assembly may include a circular insert that is received in the second hose and an elongated attachment element spanning a diameter thereof, the attachment element operable to secure the internal link thereto and provide a degree of movement to the internal link therealong. The internal link may be secured to the cart with the hose assembly via a swiveling coupler centered on an underside of the cart.

The aforementioned aspects of the present invention may also be achieved by providing a method of moving a portion of an irrigation system having a liquid conduit. In one embodiment, the method includes the steps of providing a movable cart having a plurality of wheels, securing a flexible hose assembly to the movable cart that is operable to provide a portion of the liquid conduit, and securing an internal link to the movable cart that is housed in the liquid conduit, and operable to at least partially restrict at least a portion of the flexible hose assembly.

The hose assembly used in embodiments of this method may include a first hose having a first minimum-bend diameter and a second hose having a second minimum-bend diameter that is greater than the first minimum-bend diameter. The first minimum-bend diameter may be less than a width of the movable cart, and the second minimum-bend diameter may be greater than the width of the movable cart.

The method may further include securing the second hose to the first hose with a coupling assembly. A portion of the flexible hose assembly may be a transition region that is positioned adjacent to the coupling assembly in the first hose, the transition region having a third minimum-bend diameter that is between the first minimum-bend diameter and the second minimum-bend diameter.

The method may further include securing a plurality of restricters to the internal link in the transition region to define the third minimum-bend diameter. The internal link may be housed in the first hose and secured to the second hose, and may be secured only to the movable cart and the second hose.

The method may further include a circular insert that is received in the second hose and an elongated attachment element spanning a diameter thereof, the attachment element operable to secure the internal link thereto and provide a degree of movement to the internal link therealong. The internal link and hose assembly may be secured to the cart via a swiveling coupler that is centered on an underside of the cart.

Additional aspects, advantages, and utilities of the present invention will be set forth in part in the description which follows and, in part, will be obvious from the description, or may be learned by practice of the general invention.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the illustrated embodiment.

DETAILED DESCRIPTION OF THE EXEMPLARY EMBODIMENT

The present invention is susceptible of embodiment in many forms. While the drawings illustrate, and the specification describes, certain embodiments of the invention, it is to be understood that such disclosure is by way of example only. The principles of the present invention are not limited to the particular disclosed embodiments.

With initial reference to FIGS. 1-5, a hose-fed lateral move irrigation apparatus 10 is illustrated and broadly includes a traveling cart 12 that traverses up and down a cart path 14 that is located adjacent to a field 16 with crops 18 to be irrigated. It is foreseen that another pulling vehicle or structure could be utilized instead of the cart 12 without deviating from the scope of the present invention (e.g., a hose-pull tower). The cart 12 generally includes a fluid-receiving section 20 and a fluid-dispensing section 22.

Figure 1:
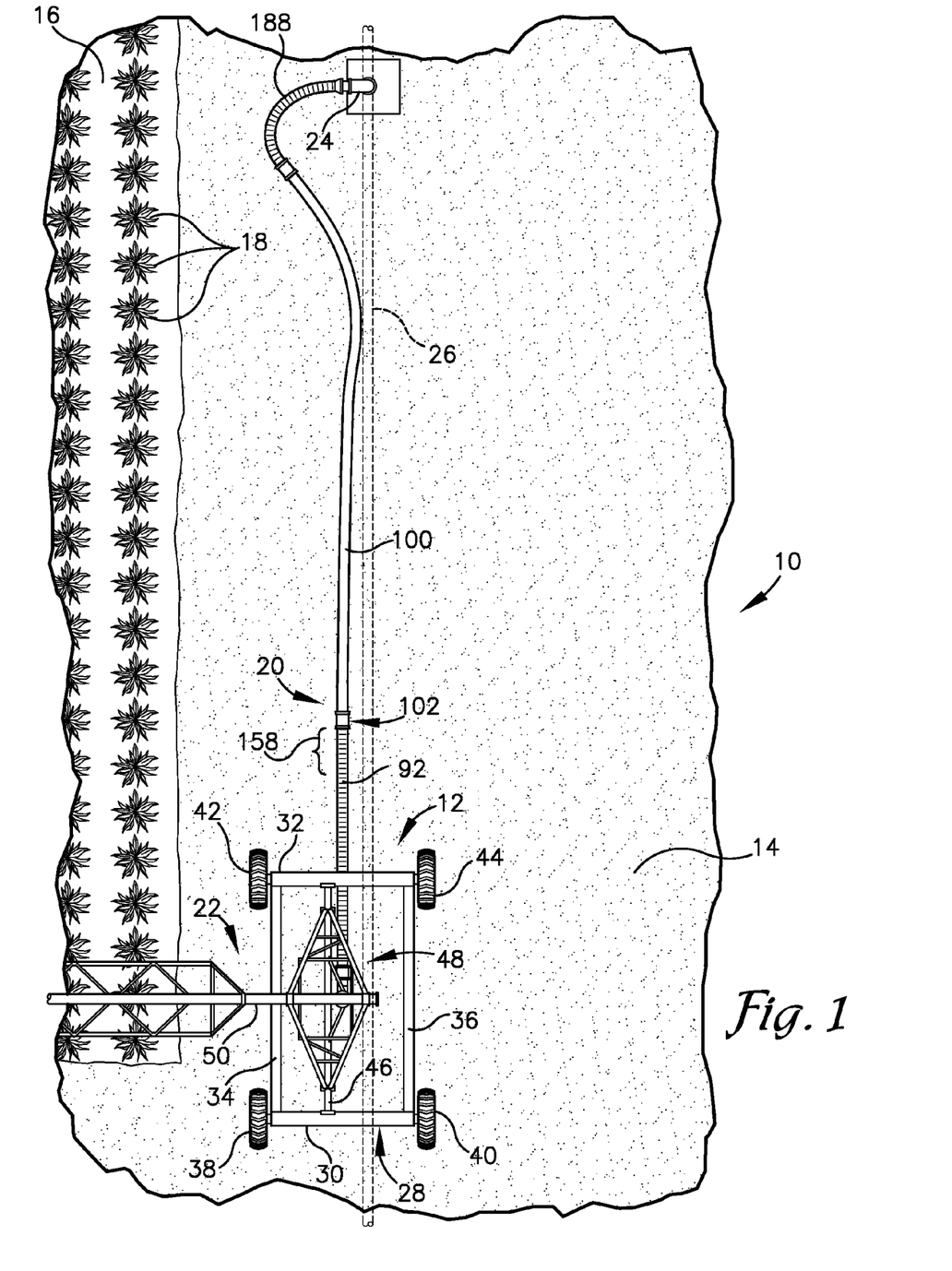
FIG. 1 is a top plan view of a hose-fed lateral move irrigation system in accordance with an exemplary embodiment of the present invention, illustrating a cart connected to a hydrant via a substantially extended rigid hose and a flexible hose.
Figure 2:
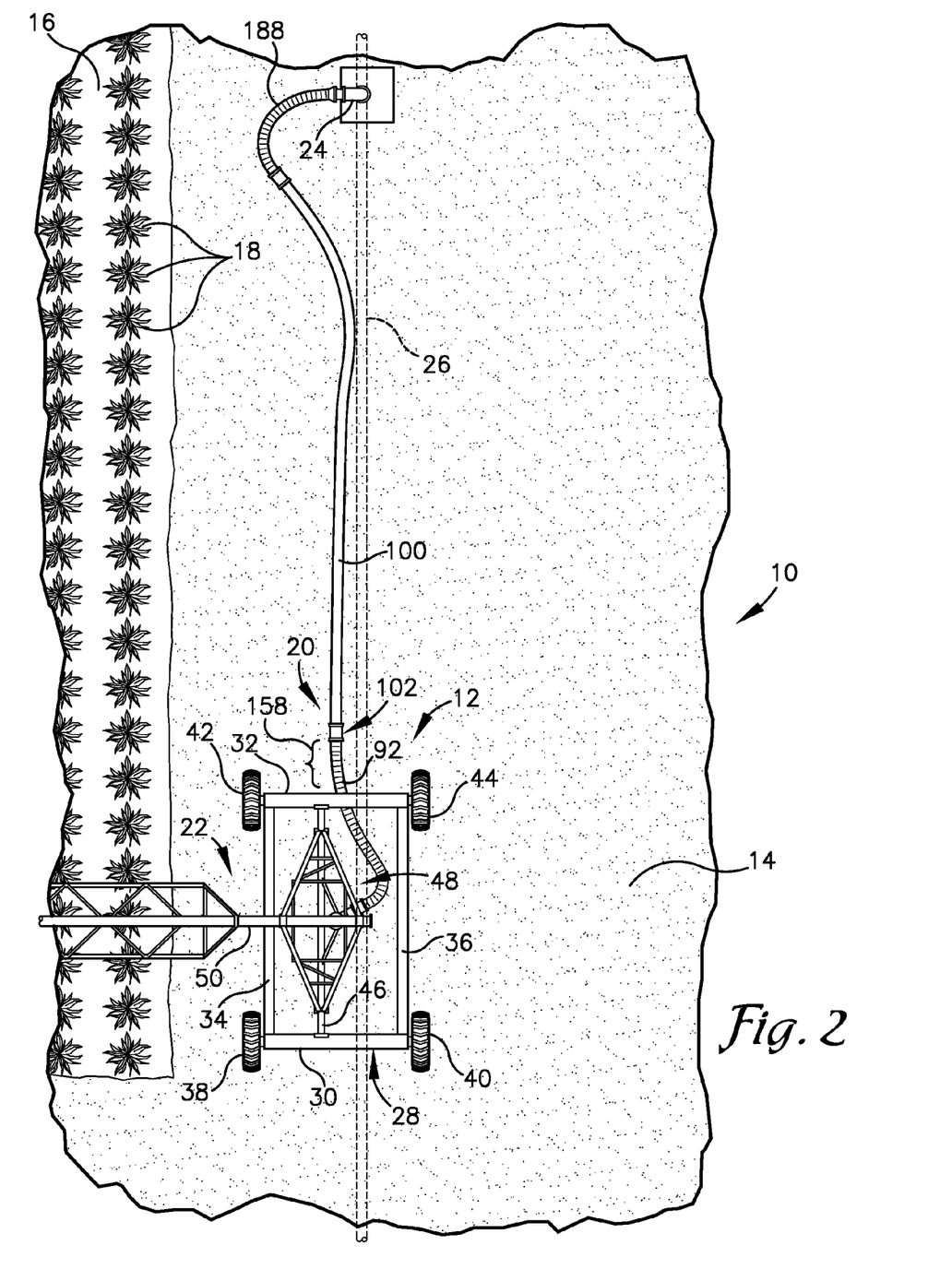
FIG. 2 is a top plan view of a hose-fed lateral move irrigation system illustrated in FIG. 1, illustrating the cart connected to the hydrant via a bent rigid hose and a flexible hose.
Figure 3:
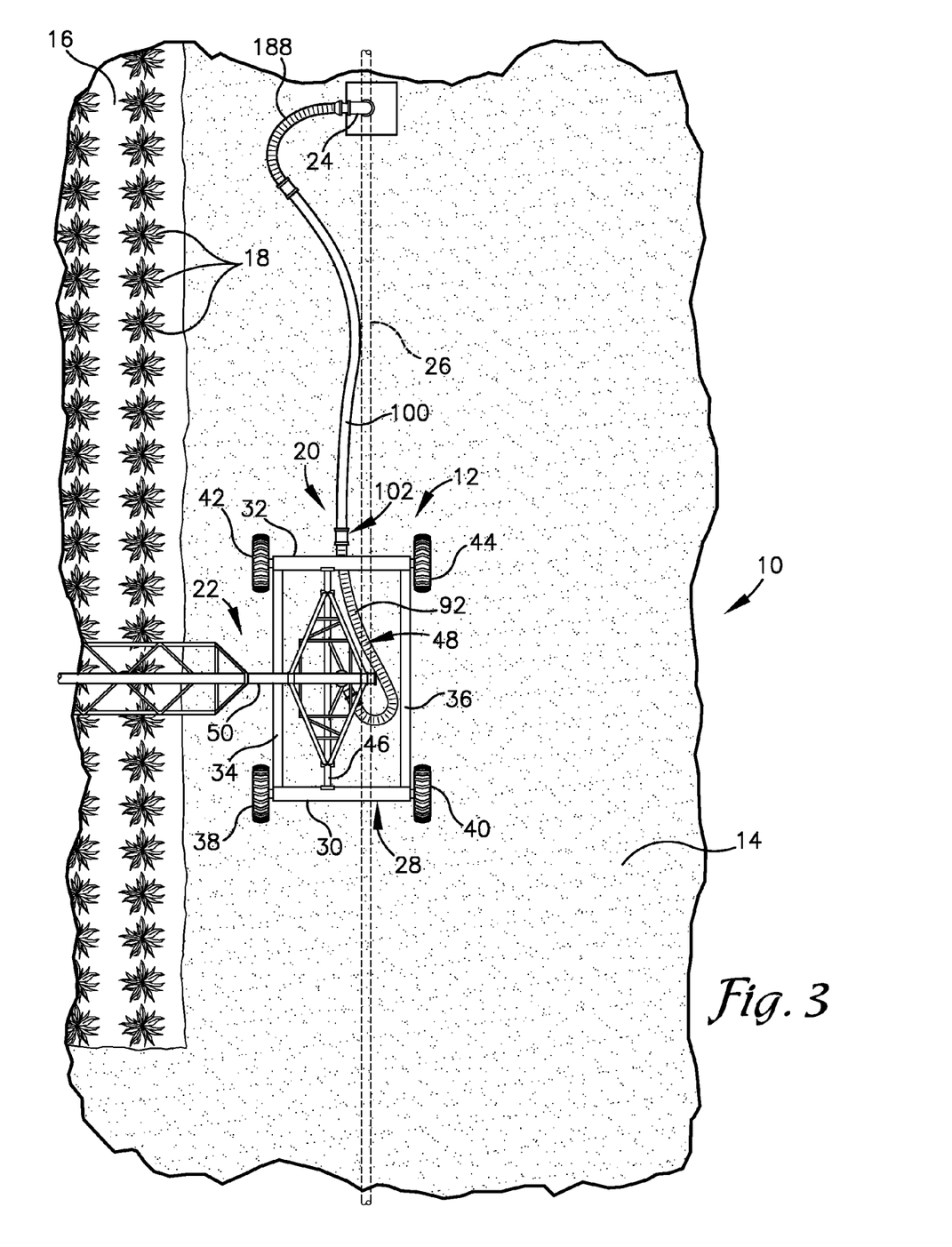
FIG. 3 is a top plan view of a hose-fed lateral move irrigation system illustrated in FIG. 1, illustrating the cart connected to the hydrant via a bent rigid hose and a flexible hose.

The fluid-receiving section 20 is connected to a fluid source (not illustrated) via a hydrant 24 and an underground pipe 26 that runs along the cart path 14. The fluid source may be a well, pond, water tank, chemical tank, and/or other like source of fluids and/or solids suspended in fluids including fertilizers and pesticides (hereinafter "fluids") and are deliverable to the crops 18 in the field 16 via the fluid-dispensing section 22 that receives the fluids from the fluid-receiving section 20.

Figure 5:
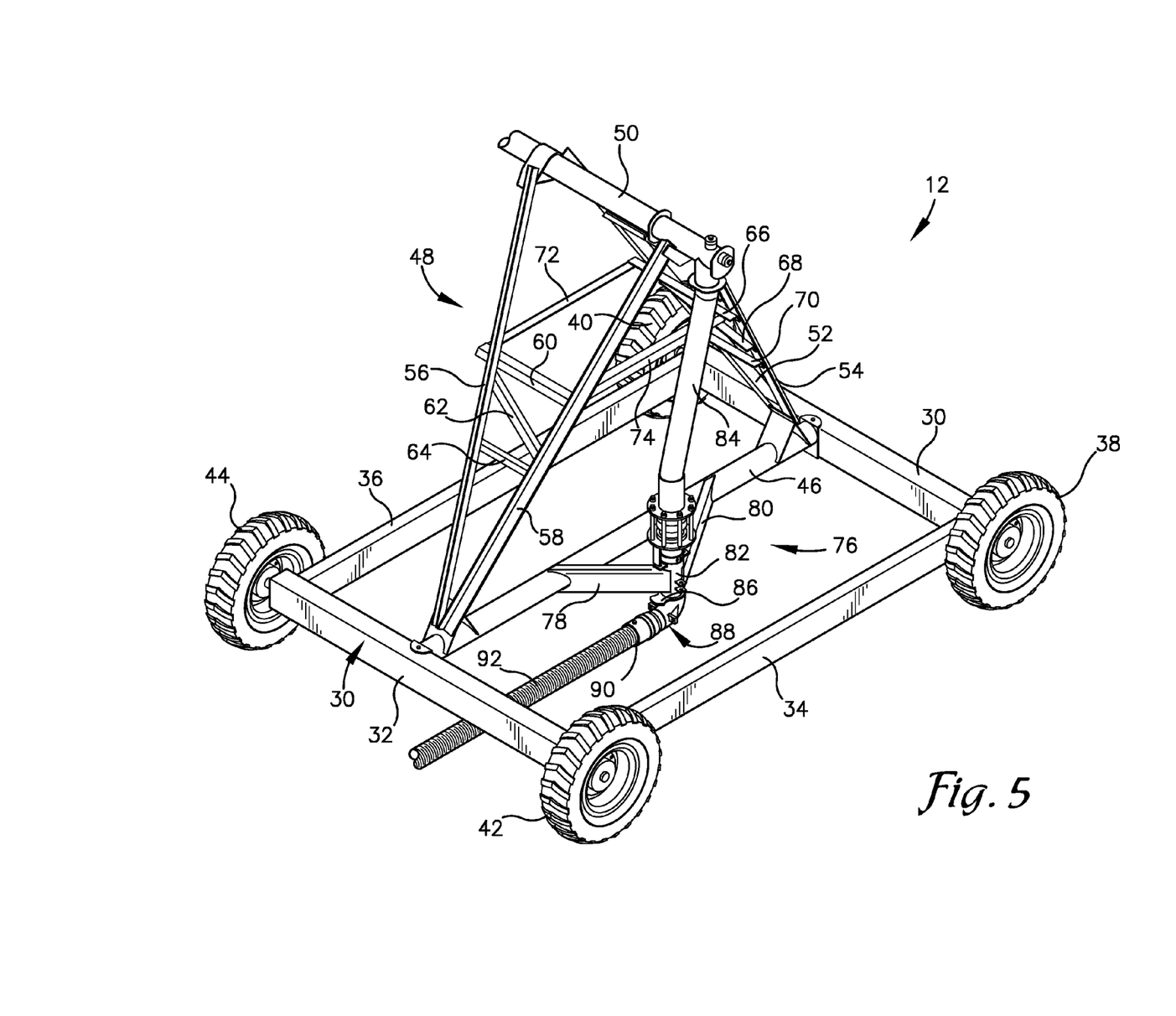
FIG. 5 is a rear right-side perspective view of the cart illustrated in FIG. 1, illustrating a connection between the cart and the flexible hose.

The cart 12 is formed by a rectangular steel or other suitable material (e.g., aluminum) frame assembly 28 that includes parallel front and rear rails 30, 32 connected by parallel side rails 34, 36 that are welded, bolted, or otherwise connected together. The front and rear rails 30, 32 are respectively connected to a pair of front wheels 38, 40 and a pair of rear wheels 42, 44.

Running parallel to and between the side rails 34, 36 is a middle rail 46 that is connected to and supported by front and rear rails 30, 32 via welding or other suitable means for attachment (e.g., bolting). The middle rail 46 increases the structural integrity of the cart 12 and provides support for a triangular tower assembly 48.

The tower assembly 48 supports an overhead fluid-distribution pipe 50 of the fluid-dispensing section 22, which includes a plurality of truss sections (not illustrated) that are supported by a plurality of mobile towers (not illustrated). The distribution pipe 50 extends outwardly from the cart 12 in a lateral direction thereto and includes a plurality of sprinklers (not illustrated) located along each of the plurality of sections of the distribution pipe 50 to communicate the fluid to the crops 18 from an ideal height above the crops 18. Details of exemplary truss sections, mobile towers, and sprinklers are shown in U.S. Pat. Nos. 4,549,694 and 7,311,275, which are hereby incorporated in their entireties by reference.

The tower assembly 48 supports the distribution pipe 50 via a pair of front support members 52, 54 and a pair of rear support members 56, 58 that connect the distribution pipe 50 to the middle rail 46 so that the distribution pipe 50 is secured overhead with respect to the cart 12. The front support members 52, 54 and rear support members 56, 58 are connected to the distribution pipe 50 at upper ends thereof that are spaced from each other and to the middle rail 46 at a common lower end thereof to form a triangular configuration. In this manner, the support members 52, 54, 56, 58 extend downwardly from the distribution pipe 50 to converge at points along the middle rail 46 that are adjacent to front and rear rails 30, 32 to secure the distribution pipe 50 therebetween and overhead with respect to the cart 12.

Each of the front support members 52, 54 and rear support members 56, 58 have cross members 60, 62, 64, and 66, 68, 70 that extend respectively therebetween to increase the structural integrity of the tower assembly 48. As illustrated in FIG. 5, cross members 60, 64, 66, 70 extend generally horizontal and cross members 62, 68 extend generally diagonal between the front support members 52, 54 and rear support members 56, 58. Additionally, cross members 72, 74 extend generally horizontal between the front support members 52, 54 and rear support members 56, 58. In the exemplary embodiment, the cross members 60, 62, 64, 66, 68, 70, 72, 74 are connected to the front support members 52, 54 and rear support members 56, 58 via screws with lock nuts (not illustrated). Any means for attachment including welding could be used to connect the cross members 60, 62, 64, 66, 68, 70, 72, 74 to the support members 52, 54, 56, 58 without departing from the scope of the present invention.

The frame 28 of the cart 12 could also assume a number of configurations without departing from the scope of the present invention. For example, the wheels 38, 42 and wheels 40, 44 may be respectively connected to side rails 34 and 36 and/or the middle rail 46 may be connected to side rails 34, 36 so that middle rail 46 runs parallel to front and rear rails 30, 32 without departing from the scope of the present invention.

Figure 6:
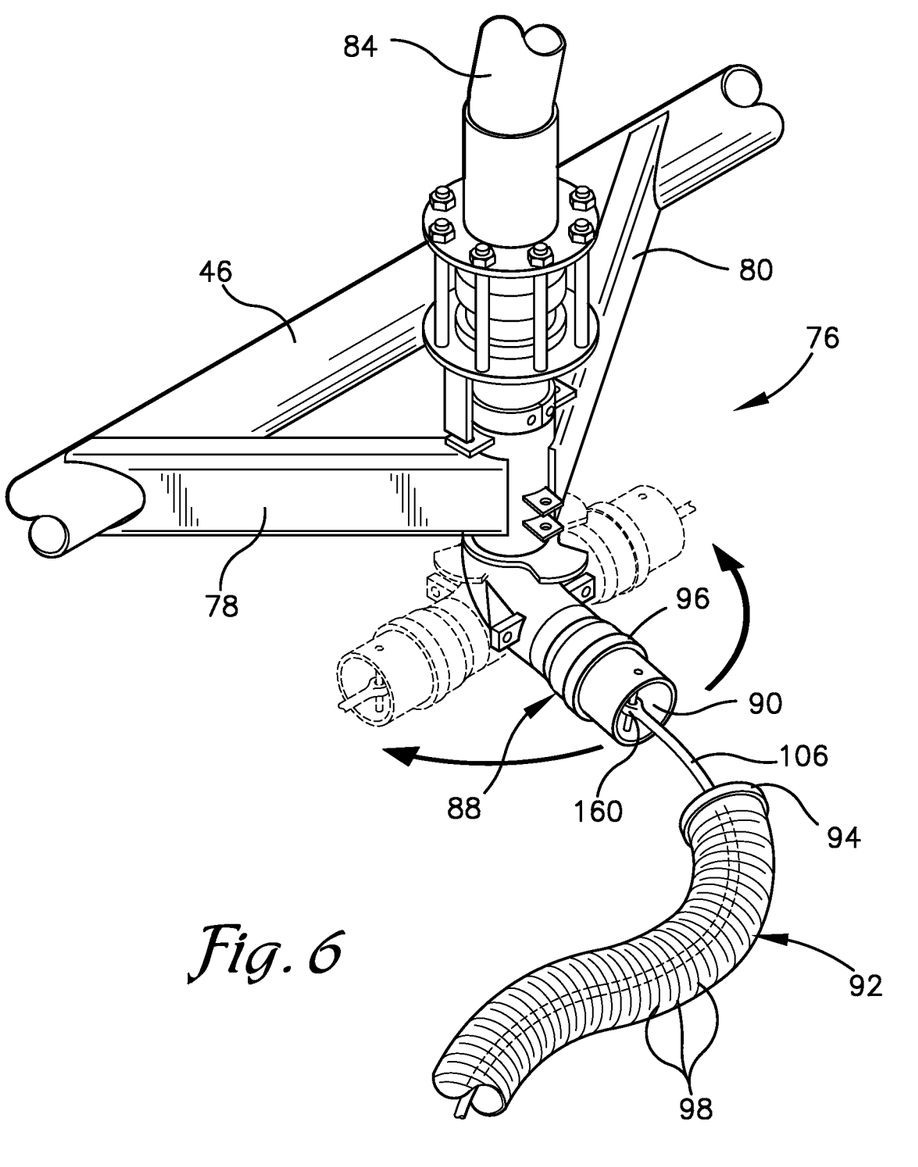
FIG. 6 is an enlarged rear right-side perspective view of the cart illustrated in FIG. 1, illustrating a pivoting connector of the cart and flexible hose.

On an underside of the distribution pipe 50 and in communication therewith is a flexible-hose attachment assembly 76 that is secured to the middle rail 46 between arms 78, 80, as illustrated in FIGS. 5 and 6. The arms 78, 80 extend substantially horizontally from the middle rail 46 and connect to the hose-attachment assembly 76 at an arm-engagement region 82. The hose-attachment assembly 76 communicates fluid to the distribution pipe 50 through a substantially vertical riser conduit 84.

Below the arm-engagement region 82 is a pivot point 86 that permit swiveling of an elbow coupler 88 located below the pivot point 86. The coupler 88 is angled downward with respect a horizontal plane defined by the frame 28 at an angle of approximately fifteen to forty-five degrees to facilitate swiveling of the coupler 88 when it is subjected to a force.

The coupler 88 swivels 180 degrees and preferably seventy-five degrees with a center point defined by the coupler 88 when oriented perpendicular to an axis defined by the rail 34 and facing a hydrant 24 right side of the cart 12. The coupler 88 may also swivel from one degree to any degree up to 360 degrees, rotate in one or both directions perpetually, or be fixed in a single direction (e.g., fixed at the center point) and may be equipped with swivel stops to define maximum degrees or limits of swivel to fit any application of the hose-fed lateral move irrigation apparatus 10 without departing from the scope of the present invention. The coupler 88 includes a nozzle tip 90 that receives a relatively soft or flexible hose 92 at a hose end 94 that extends around a circumference of the coupler 88. The coupler 88 also includes a circumferential ridge 96 spaced from the nozzle tip 90 that provides a water-tight seal between the coupler 88 and the flexible hose 92 when the flexible hose 92 is fitted there around and the flexible hose end 94 extends past the circumferential ridge 96.

The flexible hose 92 is of a material having a minimum-bend diameter that is less than a width of the cart 12. The flexible hose 92 is made of flexible polymer of vinyl chloride (PVC) having a two ft. minimum-bend diameter with a spiraled rib 98 along an entire length thereof to provide increased strength and durability for the flexible hose 92. In the exemplary embodiment, the flexible hose 92 is a water suction and discharge hose sold under the trademark Kanaline SR, which is made of PVC and has a rigid PVC helix, synthetic braiding, a smooth bore, a corrugated outer diameter, and is clear to permit visual internal inspection of material flow therethrough. It is foreseen, however, that the flexible hose 92 may be of any material of a minimum-bend diameter less than a width of the cart 12. Additionally, it is foreseen that the flexible hose 92 may be equipped with a soft rubber hose or sleeve (not illustrated) to provide increased durability to the flexible hose 92 without deviating from the scope of the present invention.

Figure 7:
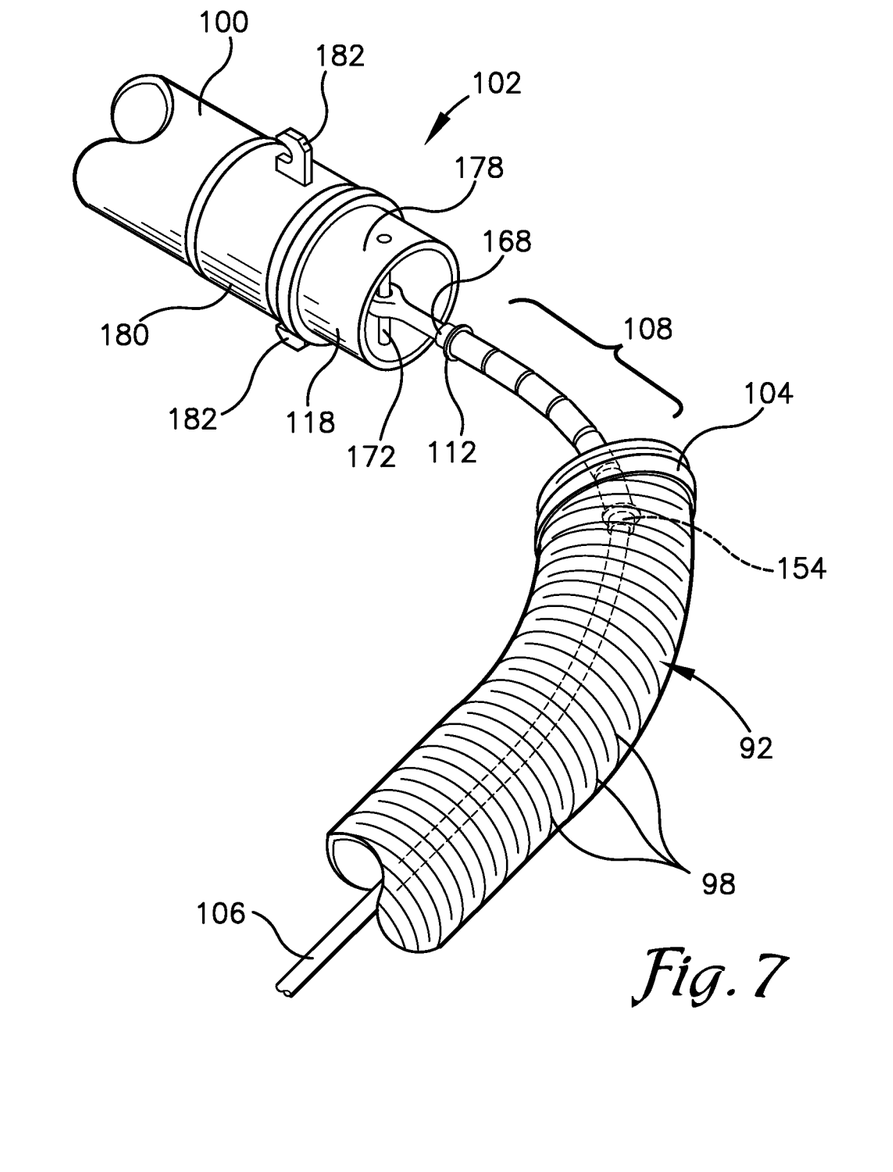
FIG. 7 is an enlarged rear right-side perspective view of a coupling assembly illustrated in FIG. 1 to connect the rigid hose to the flexible hose.
Figure 8:
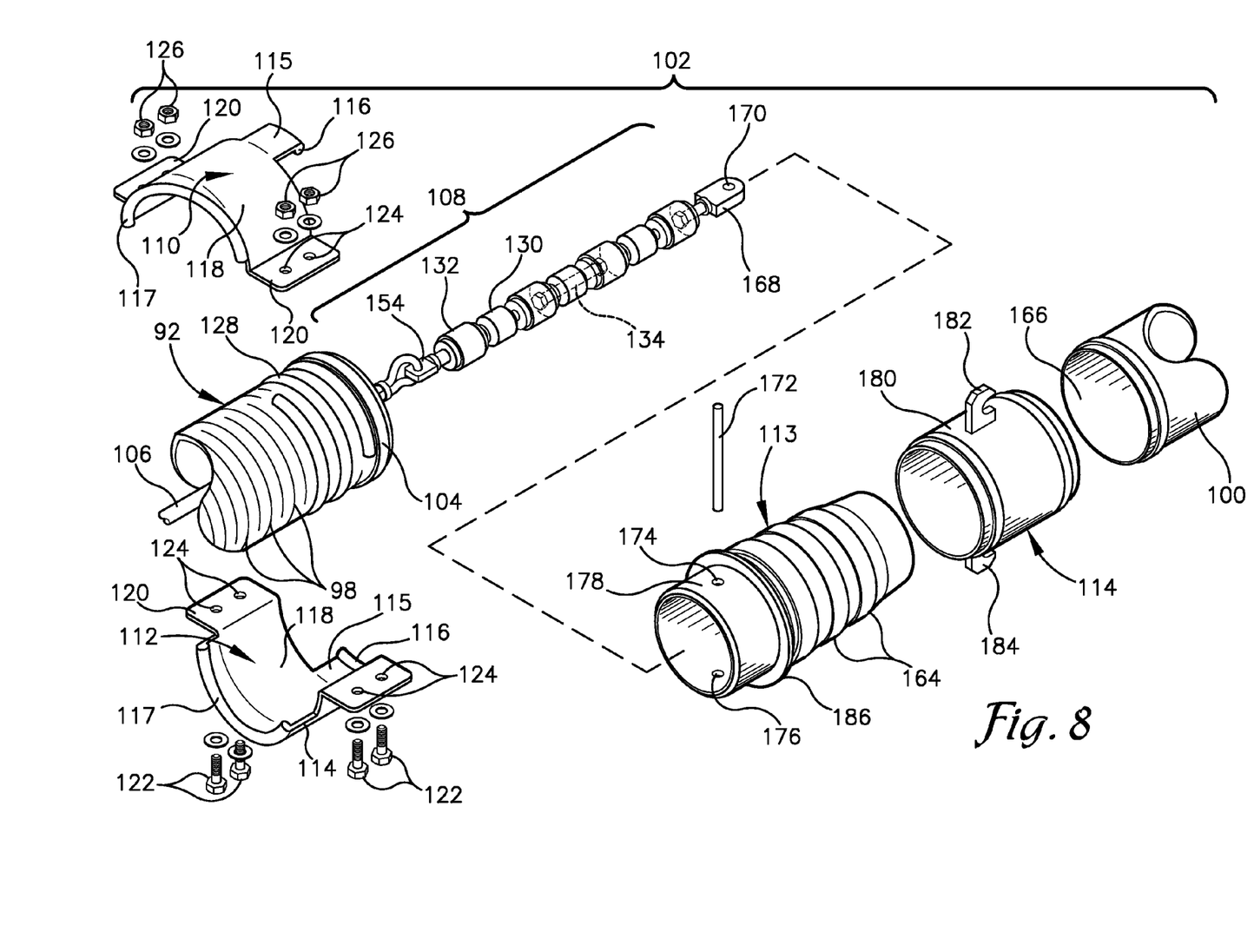
FIG. 8 is an exploded view of the coupling assembly illustrated in FIG. 5.
Figures 9, 10:
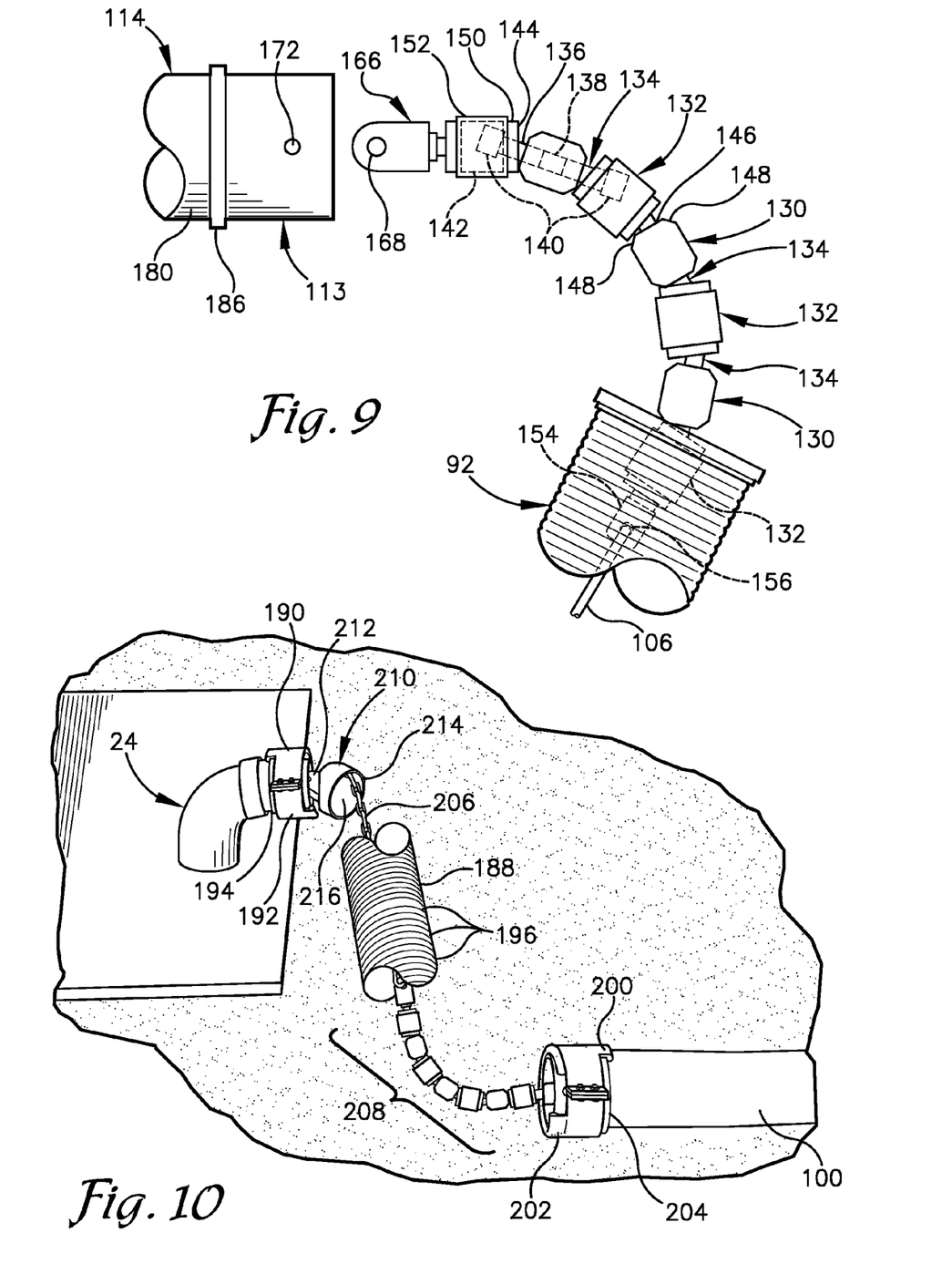
FIG. 9 is a magnified top plan view of the coupling assembly illustrated in FIG. 7.
FIG. 10 is a perspective view of a connection between a flexible hose connected to a rigid hose and a hydrant with portions of the flexible hose partially illustrated to expose internal features.

Turning to FIGS. 7-9, the flexible hose 92 connects to a relatively hard or rigid hose 100 via a coupling assembly 102, which includes a flexible hose end 104 on an opposite end of the flexible hose 92 from the hose end 94 that is connected to the coupler 88, an internal link or pull cable 106 with a bend-restrictive connection assembly 108 on an end thereof, upper and lower half clamps 110, 112, a barbed insert 113 that partially extends into the rigid hose 100, and a sleeve 114 to secure the insert 113 to the rigid hose 100.

The rigid hose 100 is made of a material with sufficient strength and durability to transport a large amount of fluid at a sufficient flow rate, withstand damage by rodents and the like, and be drug behind the cart 12 and occasionally run over by the cart 12 and other heavy-duty equipment such as tractors and the like. In the exemplary embodiment, the rigid hose 100 is made of polyethylene having a diameter of 6.625 inches, which approximately provides a flow rate of 450 g.p.m., a capacity of five ft./sec., and a fourteen ft. minimum-bend diameter. However, the rigid hose 100 could be made of any like material of sufficient strength and size, so long as the capacity of the rigid hose 100 does not exceed a velocity of five ft./sec. as such increases the likelihood of water hammer and excessive friction losses.

Extending down the entire length of the flexible hose 92 is the cable 106, which is connected at one end to the cart 12 and at the other end to the rigid hose 100. In this manner, the cart 12 is operable to drag the flexible hose 92 and the rigid hose 100 without any transfer of pull force from the rigid hose 100 to the flexible hose 92, which is instead transferred directly to the cart 12 via the cable 106. The cable 106 is made of steel to provide sufficient strength and durability in view of its high-degree of exposure to fluid within the flexible hose 92 and may be in the form of a chain. However, any like material of sufficient strength and durability could be utilized. The length of the cable 106 is equal to the pressurized length of the flexible hose 92, (e.g., a cable of forty-five feet to accommodate a forty-foot flexible hose that extends to forty-five feet when pressurized).

Extending from one side of the upper and lower half clamps 110, 112 is at least one arm 115 with a ridge 116 at an end thereof. The arm 115 extends from a curved portion 118 of each of the clamps 110, 112 and the ridge 116 extends perpendicular to the arm 115. The arm 115 and ridge 116 are sized and shaped to secure the upper and lower half clamps 110, 112 to the rigid hose 100 when the clamps 110, 112 are secured together on the flexible hose 92. On another side of the upper and lower half clamps 110, 112 is a spiral ridge 117 that extends from the clamps 110, 112 with increasing distance therefrom as the spiral ridge 117 travels around the curved portion 118 of each of the clamps 110, 112. The spiral ridge 117 is closest to the clamps 110, 112, and particularly the curved portion 118 of the upper clamp 110, at its beginning and furthest from the clamps 110, 112, and particularly the curved portion 118 of the lower clamp 112, at its end. The spiraled ridge 117 is sized and shaped to extend in between and travel along the spiraled rib 98 and secure the upper and lower half clamps 110, 112 to the flexible hose 92 when the clamps 110, 112 are secured together on the flexible hose 92. The connection of the arm 115 and ridge 116 of the upper clamp 110 to the rigid hose 100 will be further discussed hereafter.

The clamps 110, 112 are secured together via opposing tabs 120 that project from either end of the curved portion 118. A plurality of bolts 122 extend through apertures 124 in the tabs 120 and are secured therein via a plurality of nuts 126 that are threaded onto the end of the bolts 122. The clamps 110, 112 are secured together over a rolled steel coil 128 that is positioned adjacent to the flexible hose end 104 on the flexible hose 92. The coil 128 nests within the spiraled rib 98 of the flexible hose 92 and provide support for the clamps 110, 112 so that the clamps 110, 112 have a secure, even connection to the flexible hose 92.

The bend-restrictive connection assembly 108 is secured to the cable 106 and includes a plurality of first and second restricters 130, 132 secured together via a plurality of elongated ligaments 134 that extend from the first restricters 130 and are received into the second restricters 132. Each ligament 134 includes a shaft 136 that extends through the first restricter 130 and is secured therein at a center 138 of the shaft 136 via welding or the like. At the ends of each shaft 136 is a head 140 that extends into and is locked within a cavity 142 of the second restricter 132. The head 140 is locked within the cavity 142 due to its size that is larger than a size of an aperture (not illustrated) through an abutment surface 144 on the second restricter 132, which provides the head 140 with a degree of movement within the cavity 142 of each second restricter. In this manner, the ligaments 134 secure the restricters 130, 132 together while providing a degree of movement therebetween.

The first and second restricters 130, 132 are correspondingly shaped with surfaces to facilitate secure abutment with the degree of movement therebetween. Each of the first restricters 130 are round or tubular with beveled ends with a primary abutment surface 146 that is operable to abut the abutment surface 144 of one of the second restricters 132 when the cable 106 is straight, and secondary abutment surfaces 148 on either side of the primary abutment surface 146 that are operable to abut the abutment surface 144 of one of the secondary restricters 132 when the cable 106 is not straight or bent. Each of the second restricters 132 has a tubular shape with the abutment surface 144 on an outer abutment portion 150 having a circumference that is less than a circumference of a middle portion 152. The middle portion 152 forms the cavity 142 and is sized and shaped to house two heads 140 while providing the degree of movement therebetween.

The bend-restrictive connection assembly 108 is secured to the cable 106 via a cable connector 154 that is secured to an end of the plurality of second restricters 132 via welding or the like. The cable connector 154 has an aperture 156 therethrough that is sized and shaped to receive and secure the cable 106 to the cable connector 154 via welding or the like.

The bend-restrictive connection assembly 108 is housed within the flexible hose 92 in a transition region 158 of the flexible hose 92 that is adjacent to flexible hose end 104 and the coupling assembly 102, as illustrated in FIGS. 7 and 8. Because the cable 106 and the bend-restrictive connection assembly 108 reside within the flexible hose 92, the flexible hose 92 is unable to bend any further than the cable 106 is able to bend.

The cable 106 has a minimum-bend radius that is less than that of the flexible hose 92 except for at a portion of the cable 106 where the bend-restrictive connection assembly 108 is secured that is adjacent to the transition region 158 of the flexible hose 92. In the transition region 158, the bend-restrictive connection assembly 108 operably defines a minimum-bend diameter that is between the minimum-bend diameters for the flexible hose 92 and the rigid hose 100. Consequently, the flexible hose 92 adopts the minimum-bend diameter of the cable 106 at the transition region 158 so that there is a gradual change of minimum-bend diameters between the flexible hose 92 and the rigid hose 100. In this manner, the likelihood of kinking and blockage of fluid in the flexible hose 92 is decreased.

The number of restricters 130, 132 in the bend-restrictive connection assembly 108 provided along the cable 106 define the minimum-bend diameter enforced on the transition region 158 of the flexible hose 92. The addition of restricters 130, 132 increases the minimum-bend diameter of the transition region 158 and the subtraction of restricters 130, 132 decreases the minimum-bend diameter of the transition region 158. The minimum-bend diameter of the transition region 158 is preferably at least three ft. and more preferably in the range of between three and eight ft., and yet more preferably approximately four ft. via the utilization of three first restricters 130 in between four second restricters 132, as illustrated in FIG. 9.

In the present invention, the cable 106 only defines a minimum-bend diameter for the flexible hose 92 in the transition region 158. It is foreseen, however, that the cable 106 may define a minimum-bend diameter anywhere along the flexible hose 92, for example, in a portion of the flexible hose 92 that is adjacent to the coupler 88.

The cable 106 is attached to the coupler 88 via an eyelet 160 that is welded to the cable 106, and is sized and shaped to receive a pin 162 that is secured therethrough via friction fit. The pin 162 is of a diameter slightly less than a diameter of the eyelet 160 to permit a degree of vertical movement of the eyelet 160 and cable 106 along the pin 162 so as to decrease the likelihood of trapping any solids being transported in the fluid. It is foreseen that the cable 106 may be connected to the coupler 88 via other means such as welding or the like. For instance, an insert (not illustrated) having an aperture (not illustrated) may be welded to an interior of the coupler 88, and be operable to connect with the eyelet 160 of the cable 106 via a bolt and nut (not illustrated).

The cable 106 is attached to the rigid hose 100 via the bend-restrictive connection assembly 108, which is connected to the barbed insert 113 that partially extends into the rigid hose 100 and is secured therein via a plurality of barbs 164 that project from the barbed insert and are operable to secure the barbed insert 113 to an internal surface 166 of the rigid hose 100. The bend-restrictive connection assembly 108 has a hose connector 168 secured to an end thereof that is opposite to the end having the cable connector 154 via welding or the like. The hose connector 168 has an eyelet 170 that is sized and shaped to receive a pin 172 therethrough. The pin 172 is six inches long and passes through apertures 174, 176 of a ¾ inch diameter in an outer surface 178 the barbed insert 113 and is secured therein via friction fit so that the pin 172 is flush with the outer surface 178. In this manner, the barbed insert 113, and particularly the outer surface 178 of the barbed insert 113, is easily received into the flexible hose 92 so that the flexible hose 92 further secures the pin 172 in the barbed insert 113. The eyelet 170 is of a diameter slightly larger than a diameter of the pin 172 to permit a degree of vertical movement of the eyelet 170 and cable 106 along the pin 172. It is foreseen that the cable 106 may be connected to the barbed insert 113 via other means such as welding or the like.

The sleeve 114 has a rotatable connector neck 180 with hooks 182, 184 to provide alternate points of connection between the rigid hose 100 and equipment capable of moving the rigid hose 100, for example, a tractor (not illustrated). When movement of the rigid hose 100 is desired, for example, to connect the flexible hose 92 and the rigid hose 100, a tractor may be connected to one or both hooks 182, 184. To facilitate connection between the rigid hose 100 and a tractor, the neck 180 may be rotated so exposure of hooks 182, 184 is optimized without requiring substantial movement of the rigid hose 100.

When the coupling assembly 102 is assembled, the arms 115 and ridges 115 of the upper and lower clamps 110, 112 extend and are secured to a circumferential rib 186 on the barbed connector 113. In this manner, the clamps 110, 112 secure the flexible hose 92 to the rigid hose 100.

The flexible hose 188 extends to and is connected to the hydrant 24, the underground pipe 26, and ultimately the fluid source (not illustrated) via a flexible hose 188, which is secured to the hydrant 24 via upper and lower half clamps 190, 192. The clamps 190, 192 are identical to and operate in the same manner as the clamps 110, 112. The clamps 190, 192 respectively engage a circumferential rib 194 on the hydrant 24 and a spiraled rib 196 on the flexible hose 188 to provide a secure connection between the hydrant 24 and the flexible hose 188.

The flexible hose 188 is secured to the rigid hose 100 via a barbed insert 198 and upper and lower half clamps 200, 202. The barbed insert 198 is identical to and operates in the same manner as the barbed insert 113 and the clamps 200, 202 are identical to and operate in the same manner as the clamps 110, 112. The clamps 110, 112 respectively engage a circumferential rib 204 on the barbed insert 198 and the spiraled rib 196 on the flexible hose 188 to provide a secure connection between the flexible hose 188 and the rigid hose 100.

The flexible hose 188 houses a steel cable or chain 206 and a bend restrictive connection assembly 208 that connects the rigid hose 100 to the hydrant 24. In this manner, any pull force from the rigid hose 100 is transmitted directly to the hydrant 24 and not to the flexible hose 188. The chain 206 connects to the hydrant 24 at a swiveling connector 210 via welding or the like and defines a maximum distance between the hydrant 24 and the rigid hose 100 and a maximum degree of expansion of the flexible hose 188. The chain 206 is made of steel to provide sufficient strength and durability in view of its high-degree of exposure to fluid within the flexible hose 188 and may be in the form of a cable. It is foreseen that the chain 206 may be utilized externally (i.e., connected to the hydrant 24 and rigid hose 100 externally) without departing from the scope of the present invention.

The swiveling connector 210 is secured to the hydrant 24 at a pivot point 212 via welding or the like and has a circumferential frame 214 with an aperture therethrough. The swiveling connector 210 is operable to be inserted into the flexible hose 188 and pivot approximately twenty degrees, with a center point defined by the swiveling connector 210 when oriented parallel to the hydrant 24. The swiveling connector 210 pivots when it is subjected to a pull force (e.g., from the rigid hose 100). The circumferential frame 214 maintains the circular shape of the flexible hose 188 to prevent kinking of the flexible hose 188 (e.g., when the rigid hose 100 is pulling the chain 206 tight and pivoting the swiveling connector 210). In this manner, the connection between the hydrant 24 and the flexible hose 188 does not require a bend restrictive connection assembly or the like.

The bend restrictive connection assembly 208 is identical to and operates in the same manner as the bend restrictive connection assembly 108. The bend restrictive connection assembly 208 connects the chain 206 to the barbed insert 198 of the rigid hose 100 to enforce a minimum bend radius on the flexible hose 188 at the connection between the flexible hose 188 and the rigid hose 100. In this manner, the bend restrictive connection assembly 208 defines a minimum-bend diameter for the flexible hose 188 at the connection between the flexible hose 188 and the rigid hose 100.

When hydrant 24 is selectively activated via a shutoff valve (not illustrated) and is located in the center of the cart path 14. The location of the hydrant 24 defines a length of the combined flexible and rigid hoses 92, 100, 188. For example, if the hydrant 24 is placed in the middle of the field 16, the length of the combined flexible and rigid hoses 92, 100, 188 may be approximately equal to half of the field 16. As such, if the field 16 is 1000 ft., the combined flexible and rigid hoses 92, 100, 188 is 500 ft. In this manner, the flexible and rigid hoses 92, 100, 188 are fully extended and straight when the cart 12 reaches an end of the field 16, which decreases the likelihood of kinking.

For purposes of describing the present invention 10 in use, the course of the cart 12 will be limited to a simple forward and backward traverse along the cart path 14 without any pivoting of the fluid-dispensing section 22. It is foreseen, however, that the cart 12 may be of an unlimited variety of courses depending on a field to be irrigated.

In use, the rigid hose 100 is connected to the hydrant 24 and aligned using a tractor or other vehicle (not illustrated) from the hydrant 24 to an end of the cart path 14 where the cart 12 is situated in a starting position, as illustrated in FIG. 1. To facilitate alignment of the rigid hose 100, the hooks 182, 184 of the barbed insert 113 in the rigid hose 100 may be utilized, which may require rotation of the neck 180 to expose the hooks 182, 184. Additionally, the chain 206 may be utilized to facilitate alignment at the hydrant 24. Once the rigid hose 100 is aligned, the rigid hose 100 is connected to the flexible hoses 92, 188, which are respectively connected to the coupler 88 and hydrant 24. In this manner, a circuit between the fluid-receiving section 20 and the fluid-dispensing section 22 is closed.

The hydrant 24, which has a shutoff valve (not illustrated) operable to activate and deactivate a flow of fluid, is activated so that fluid travels through the fluid-receiving section 20 and fluid-dispensing section 22 to the crops 18 for irrigation thereof. The cart 12 then begins to travel forward from a starting point at a predetermined rate with the distribution pipe 50 irrigating crops 18 adjacent to the cart 12. The cart 12 travels forward while dragging the flexible and rigid hoses 92, 100 until it reaches an end of the cart path 14, at which point the flexible and rigid hoses 92, 100, 188 are fully extended and substantially straight, as illustrated in FIG. 1.

The cart 12 is then reversed along the cart path 14 causing the cart 12 to travel over and straddle the flexible and rigid hoses 92, 100, 188, and hydrant 24 between the wheels 38, 40, 42, 44 with the distribution pipe 50 irrigating crops 18 adjacent to the cart 12 a second time, as illustrated in FIGS. 1-4. As the cart 12 departs the end of the cart path 14 and begins to drag the flexible hose 92 to an opposite end of the cart path 14 and back to the starting point, a bend in the flexible hose 92 is formed, which results in a 180 degree loop of the flexible hose 92, and causes the coupler 88 to be subjected a compression force. Due to the two ft. minimum-bend diameter of the flexible hose 92, the bend and resultant loop in the flexible hose 92 is maintained between the wheels 38, 40, 42, 44 of the cart 12.

As the cart 12 progresses back toward the starting point at the opposite end of the cart path 14, the compression force causes the coupler 88 to swivel in a direction of the compression force while the bend in the flexible hose 92 travels along the flexible hose 92 at a rate essentially equal to a rate the cart 12 is traveling. As such, the bend generally remains in a fixed position with respect to the cart path 14 for a period of travel of the cart 12.

Figure 4:
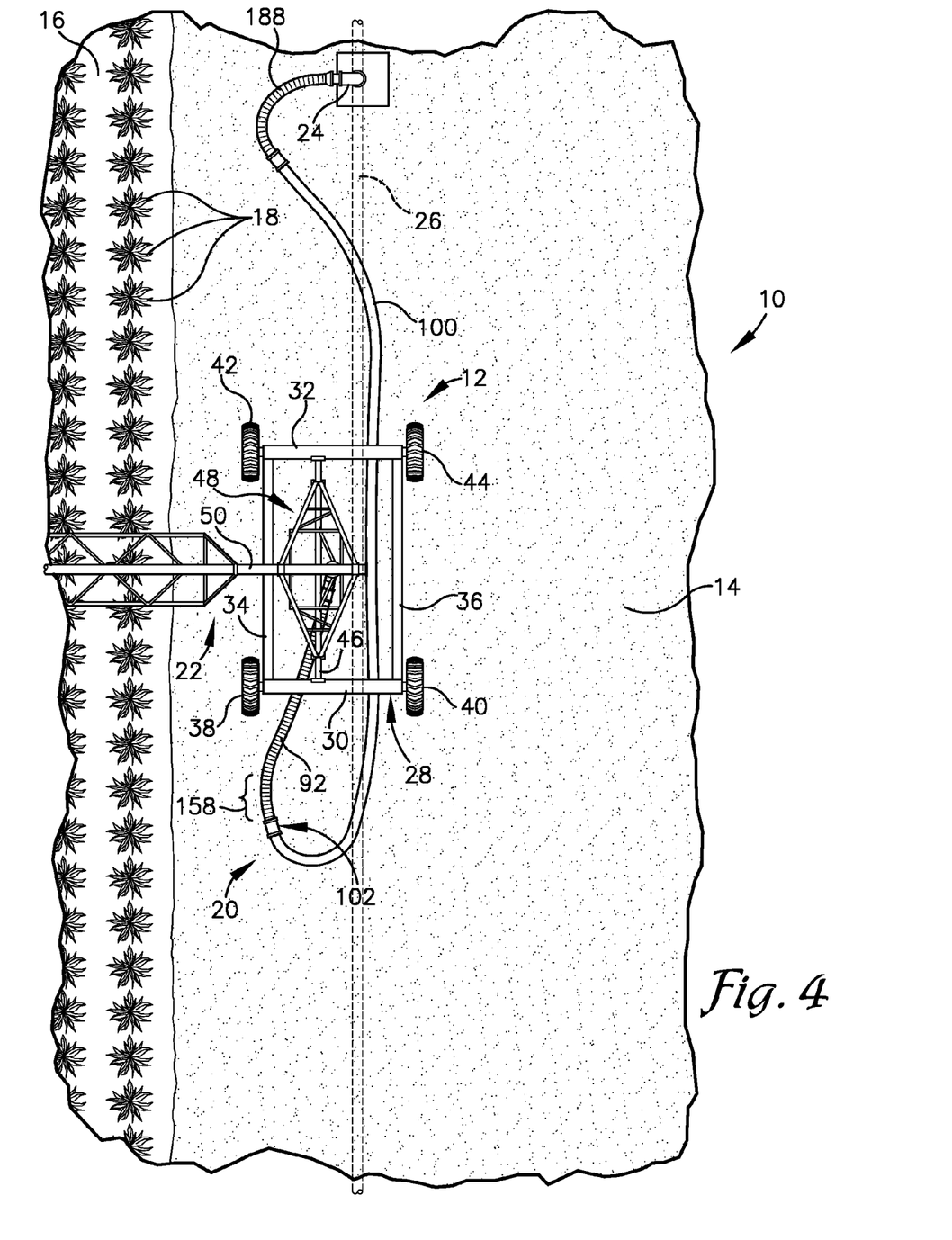
FIG. 4 is a top plan view of a hose-fed lateral move irrigation system illustrated in FIG. 1, illustrating the cart connected to a hydrant via a bent rigid hose and a flexible hose.

When the cart 12 is approximately six to eight ft. past the bend in the flexible hose 92, the bend meets the transition region 158 and the coupling assembly 102. Due to the approximate four ft. minimum-bend diameter of the transition region 126 defined by the bend restrictive connection assembly 108, the bend and resultant loop increase in diameter. When the bend meets the coupling assembly 102 and begins to travel along the rigid hose 100, the flexible hose 92 becomes straight and the rigid hose 100 bends in a 180 degree loop. Due to the fourteen ft. minimum-bend diameter of the rigid hose 100, the bend and resultant loop in the rigid hose 100 increases in diameter and extends substantially beyond the width of the cart 12 and wheels 38, 40, 42, 44. Because the loop, at this point, is well behind the cart 12, as illustrated in FIG. 4, the loop is not problematic to the hose-fed lateral move irrigation apparatus 1.

As the cart 12 nears the opposite end of the cart path 14, the flexible and rigid hoses 92, 100 become straight and the coupler 88 has swivelled seventy-five degrees in a direction of the hydrant 24 to ensure that the flexible hose 92 does not kink and that the loop is formed towards the hydrant 24. Additionally, the swiveling connector 210 has pivoted twenty degrees in a direction of the cart 12 and the circumferential frame 214 to ensure that the flexible hose 188 maintains its circular shape and does not kink. When the cart 12 reaches the opposite end of the cart path 14 and comes to a stop, the flexible and rigid hoses 92, 100, 188 have no slack and the likelihood of kinking is decreased.

The embodiments of the present invention described above are to be used as illustration only, and should not be utilized in a limiting sense in interpreting the scope of the present invention. Obvious modifications to the embodiments, as hereinabove set forth, could be readily made by those skilled in the art without departing from the spirit of the present invention. For instance, those skilled in the art will appreciate that the principles of the present invention are not limited to use with a lateral-move irrigation system, but may be employed with other types of irrigation systems.

The inventors hereby state their intent to rely on the Doctrine of Equivalents to determine and assess the reasonably fair scope of the present invention as pertains to any apparatus not materially departing from but outside the literal scope of the present invention as set forth in the following claims.

What is claimed is:

1. An irrigation system having a liquid conduit for the delivery of liquid, the system comprising:
   a movable cart having a plurality of wheels;
   a flexible hose assembly secured to the movable cart and operable to provide a portion of the liquid conduit, the flexible hose assembly including:
   a first hose defining a transition region; and
   a second hose that is more rigid than the first hose; and
   an internal link (i) secured to the movable cart, (ii) housed in the liquid conduit, and (iii) operable to partially restrict at least a portion of the flexible hose assembly, the internal link including a cable or chain and a bend-restrictive connection assembly, the bend-restrictive connection assembly being positioned within the transition region of the first hose and having a minimum bend diameter that is greater than a minimum bend diameter of the first hose so that the first hose adopts the minimum bend diameter of the bend-restrictive connection assembly in the transition region, wherein "minimum bend diameter" is defined as the bend diameter at which a given assembly or hose will not bend further without breaking, kinking, or blocking fluid, the bend-restrictive connection assembly having a plurality of bend restrictors connected to each other in series, the bend restrictors including a plurality of connectors, a plurality of spacers disposed between the connectors, and a plurality of ligaments extending through the spacers and terminating within the connectors.

2. The irrigation system as claimed in claim 1, wherein the internal link is housed in the first hose and secured to the second hose.

3. The irrigation system as claimed in claim 2, wherein the internal link is secured only to the movable cart and the second hose.

4. The irrigation system as claimed in claim 1, further comprising a coupling assembly in the second hose operable to secure the second hose to the first hose, the coupling assembly including a circular insert that is received in the second hose and an elongated attachment pin extending across the circular insert, the internal link including an eyelet connected to the elongated attachment pin and having a diameter sufficiently wide that the elongated attachment pin is operable to secure the internal link thereto and provide a degree of movement to the internal link therealong.

5. The irrigation system of claim 1, wherein the bend-restrictive connection assembly includes four connectors and three spacers.

6. The irrigation system of claim 1, wherein the minimum bend diameter of the transition region is between 3 and 8 feet.

7. The irrigation system of claim 6, wherein the minimum bend diameter of the transition region is 4 feet.

8. An irrigation system comprising:
   a movable cart having a plurality of wheels;
   a first flexible hose configured to be secured to a water source and defining a first transition region;
   a first flexible internal link (i) configured to be secured to the water source, (ii) substantially housed in the first flexible hose, and (iii) operable to partially restrict at least a portion of the first flexible hose;
   a relatively rigid hose secured to the first flexible hose and the first internal link at a first end of the relatively rigid hose;
   a second flexible hose secured to a second end of the relatively rigid hose opposite the first end and secured to the movable cart, the second flexible hose defining a second transition region; and
   a second flexible internal link (i) secured to the relatively rigid hose and the movable cart, (ii) housed in the second flexible hose, and (iii) operable to partially restrict at least a portion of the second flexible hose, the first and second flexible internal links each including a cable or chain and a bend-restrictive connection assembly, the bend-restrictive connection assemblies being positioned within the transition regions of the flexible hoses and each having a minimum bend diameter that is greater than a minimum bend diameter of the flexible hoses so that the flexible hoses adopt the minimum bend diameter of the bend-restrictive connection assemblies in the transition regions, wherein "minimum bend diameter" is defined as the bend diameter at which a given assembly or hose will not bend further without breaking, kinking, or blocking fluid, the bend-restrictive connection assemblies each having a plurality of bend restrictors connected to each other in series, the bend restrictors including a plurality of connectors, a plurality of spacers disposed between the connectors, and a plurality of ligaments extending through the spacers and terminating within the connectors.

9. The irrigation system as claimed in claim 8, further comprising first and second coupling assemblies in the relatively rigid hose, the first and second coupling assemblies being operable to secure the relatively rigid hose to the first flexible hose and the second flexible hose, respectively.

10. The irrigation system as claimed in claim 9, wherein the coupling assemblies each include a circular insert that is received in the relatively rigid hose and an elongated attachment pin extending across the circular insert and the flexible internal links each include an eyelet connected to the elongated attachment pin of the respective coupling assemblies, each eyelet having a diameter sufficiently wide that the elongated attachment pin is operable to secure the respective flexible internal link thereto and provide a degree of movement to the respective flexible internal link therealong.

11. The irrigation system as claimed in claim 8, wherein the bend-restrictive connection assemblies are positioned adjacent the relatively rigid hose for preventing kinking of the flexible hoses near the relatively rigid hose.

12. The irrigation system as claimed in claim 8, wherein the first flexible internal link is configured to be secured only to the water source and the relatively rigid hose and the second flexible internal link is configured to be secured only to the movable cart and the relatively rigid hose.

13. The irrigation system as claimed in claim 8, further comprising a swiveling coupler centered on an underside of the cart to secure the second flexible internal link and the second flexible hose thereto.

14. The irrigation system of claim 8, wherein the bend-restrictive connection assemblies each include four connectors and three spacers.

15. The irrigation system of claim 8, wherein the minimum bend diameter of the transition regions is between 3 and 8 feet.

16. The irrigation system of claim 15, wherein the minimum bend diameter of the transition regions is 4 feet.

17. An irrigation system having a liquid conduit for the delivery of liquid, the system comprising:
a movable cart having a plurality of wheels;
a first flexible hose configured to be secured to a water source and operable to provide a portion of the liquid conduit, the first flexible hose defining a first transition region;
a first flexible internal link being (i) configured to be secured to the water source, (ii) substantially housed in the first flexible hose, and (iii) operable to partially restrict at least a portion of the first flexible hose;
a relatively rigid hose secured to the first flexible hose and the first internal link at a first end of the relatively rigid hose and operable to provide a majority portion of the liquid conduit;
a second flexible hose being secured to a second end of the relatively rigid hose opposite the first end and secured to the movable cart and operable to provide a portion of the liquid conduit, the second flexible hose defining a second transition region;
a second flexible internal link being (i) secured to the relatively rigid hose and the movable cart, (ii) housed in the second flexible hose, and (iii) operable to partially restrict at least a portion of the second flexible hose; and
first and second coupling assemblies disposed in the relatively rigid hose and each including a circular insert that is received in the relatively rigid hose and an elongated attachment pin extending across the circular insert for connecting the respective flexible internal link thereto, the coupling assemblies being operable to secure the relatively rigid hose to the first and the second flexible hose, respectively,
the first and second flexible internal links each including a cable or chain and a bend-restrictive connection assembly, the bend-restrictive connection assemblies being positioned within the transition regions of the flexible hoses and each having a minimum bend diameter that is greater than a minimum bend diameter of the flexible hoses so that the flexible hoses adopt the minimum bend diameter of the bend-restrictive connection assemblies in the transition regions, the minimum bend diameter of the bend-restrictive connection assemblies being less than a minimum bend diameter of the relatively rigid hose, wherein "minimum bend diameter" is defined as the bend diameter at which a given assembly or hose will not bend further without breaking, kinking, or blocking fluid, the bend-restrictive connection assemblies each having a plurality of bend restrictors connected to each other in series, the bend restrictors including a plurality of connectors, a plurality of spacers disposed between the connectors, and a plurality of ligaments extending through the spacers and terminating within the connectors.

* * * * *